(12) United States Patent
Depew

(10) Patent No.: US 12,442,705 B2
(45) Date of Patent: Oct. 14, 2025

(54) DIFFERENTIAL PRESSURE SENSORS, CONTROL, AND ASSOCIATED METHODS

(71) Applicant: TPE MIDSTREAM LLC, Tulsa, OK (US)

(72) Inventor: Carson Depew, Broken Arrow, OK (US)

(73) Assignee: TPE MIDSTREAM LLC, Tulsa, OK (US)

( * ) Notice: Subject to any disclaimer, the term of this patent is extended or adjusted under 35 U.S.C. 154(b) by 86 days.

(21) Appl. No.: 18/555,692

(22) PCT Filed: Apr. 22, 2022

(86) PCT No.: PCT/US2022/025983
§ 371 (c)(1),
(2) Date: Oct. 16, 2023

(87) PCT Pub. No.: WO2022/226331
PCT Pub. Date: Oct. 27, 2022

(65) Prior Publication Data
US 2024/0201038 A1 Jun. 20, 2024

Related U.S. Application Data

(60) Provisional application No. 63/178,332, filed on Apr. 22, 2021.

(51) Int. Cl.
*G01L 13/02* (2006.01)
*G01L 7/16* (2006.01)
*G05D 16/00* (2006.01)

(52) U.S. Cl.
CPC ............ *G01L 13/02* (2013.01); *G05D 16/028* (2019.01)

(58) Field of Classification Search
CPC ......... G01L 7/16; G01L 13/02; G01L 9/0089; G05D 16/028
See application file for complete search history.

(56) References Cited

U.S. PATENT DOCUMENTS

| 4,679,441 A | 7/1987 | Johnson et al. |
| 5,410,947 A | 5/1995 | Garnjost |

(Continued)

FOREIGN PATENT DOCUMENTS

| CN | 202614465 U | 12/2012 |
| CN | 104454787 A | 3/2015 |

(Continued)

OTHER PUBLICATIONS

International Searching Authority, "International Preliminary Report on Patentability," issued in connection with PCT Patent Application No. PCT/US2022/025983, issued on Nov. 2, 2023, 7 pages.

(Continued)

*Primary Examiner* — Paul J Gray
(74) *Attorney, Agent, or Firm* — Hanley, Flight & Zimmerman, LLC

(57) ABSTRACT

Differential pressure sensors, control, and associated methods are disclosed. An example apparatus includes a first housing including a first port, the first port fluidly coupled to a first location, first fluid to flow into the first port from the first location, a second housing coupled to the first housing, the second housing including a second port, the second port fluidly coupled to a second location, second fluid to flow into the second port from the second location, and a piston slidably disposed between the first and second housings, the first and second fluids to cause movement of the piston, the movement of the piston corresponding to a differential pressure between the first and second locations.

13 Claims, 6 Drawing Sheets

(56) References Cited

U.S. PATENT DOCUMENTS

| | | | |
|---|---|---|---|
| 5,970,797 A | 10/1999 | Hunter | |
| 2006/0005556 A1* | 1/2006 | Hirota | F04B 27/14 |
| | | | 62/216 |
| 2013/0139571 A1 | 6/2013 | Gröner | |

FOREIGN PATENT DOCUMENTS

| | | |
|---|---|---|
| CN | 216199398 U | 4/2022 |
| GB | 2620332 A | 10/2022 |
| KR | 20180135967 A | 12/2018 |
| WO | 2020124267 A1 | 6/2020 |

OTHER PUBLICATIONS

International Searching Authority, "International Search Report and Written Opinion," issued in connection with International Patent Application No. PCT/US2022/025983, issued on Aug. 12, 2022, 10 pages.

Saudi Authority for Intellectual Property, "1st Examination Report," issued in connection with PCT National Phase Application No. 523451204, mailed on Aug. 27, 2024, 14 pages, with English translation.

Saudi Authority for Intellectual Property, "1st Examination Report," issued in connection with PCT National Phase Application No. 524462276, dated Jan. 30, 2025, 14 pages, with English translation.

United Kingdom Patent Office, "Patents Act 1977: Intention to Grant under Section 18(4)," issued in connection with United Kingdom Patent Application No. GB2315982.5, dated Feb. 4, 2025, 2 pages.

United Kingdom Intellectual Property Office, "Examination Report under section 18(3)," issued in connection with United Kingdom Patent Application No. 2315982.5, dated Jun. 26, 2024, 2 pages.

Australian Government, IP Australia," Patent Examination Report No. 1," issued in connection with Australian Application No. 2022261135, issued on Jul. 9, 2024, 4 pages.

Australian Government, IP Australia, "Notice of acceptance for patent application," issued in connection with Australian Patent Application No. 2022261135, dated Nov. 22, 2024, 4 pages.

Canada Patent Office, "Examiner Requisition," issued with connection with Canada Patent Application No. 3,215,877, mailed on Dec. 2, 2024, 4 pages.

European Patent Office, "Extended European Search Report," issued in connection with European Patent Application No. 22792593, dated Jan. 27, 2025, 4 pages.

United Kingdom Patent Office, "Notification of Grant," issued in connection with United Kingdom Patent Application No. 2315982. 5, dated Mar. 18, 2025, 2 pages.

Australian Government, IP Australia, "Notice of grant for your patent," issued in connection with Australian Patent Application No. 2022261135, dated Mar. 20, 2025, 1 page.

Australian Government, IP Australia, "Certificate of Grant," issued in connection with Australian Patent Application No. 2022261135, dated Mar. 20, 2025, 1 page.

European Patent Office, "Extended European Search Report," issued in connection with European Patent Application No. GB2503047.9, dated Apr. 17, 2025, 6 pages.

United Arab Emirates, "Search Report," issued in connection with Patent Application No. P2023-6002746, mailed on May 21, 2025, 2 pages.

United Arab Emirates, "Examination Result," issued in connection with Patent Application No. P2023-6002746, mailed on May 21, 2025, 6 pages.

* cited by examiner

DIFFERENTIAL PRESSURE SENSORS, CONTROL, AND ASSOCIATED METHODS

RELATED APPLICATION

This patent arises from a U.S. National Stage Patent Application under U.S.C. 371 of PCT Patent Application No. PCT/US2022/025983, titled "Differential Pressure Sensors, Control, And Associated Methods," filed Apr. 22, 2022, which claims priority to U.S. Provisional Application No. 63/178,332, titled "Differential Pressure Sensors, Control, and Associated Methods," filed Apr. 22, 2021. PCT Patent Application No. PCT/US2022/025983 and U.S. Provisional Application No. 63/178,332 are hereby incorporated by reference in their entireties.

FIELD OF THE DISCLOSURE

This disclosure relates generally to sensors, and, more particularly, to differential pressure sensors, control, and associated methods.

BACKGROUND

Differential pressure sensors can be coupled between first and second locations in a fluid system to measure a differential pressure therebetween. Fluid enters the differential pressure sensor from the first and second locations, and the fluid causes movement and/or deflection of one or more components in the differential pressure sensor. A measurement of the differential pressure can be determined based on the movement and/or deflection.

Figure 1:
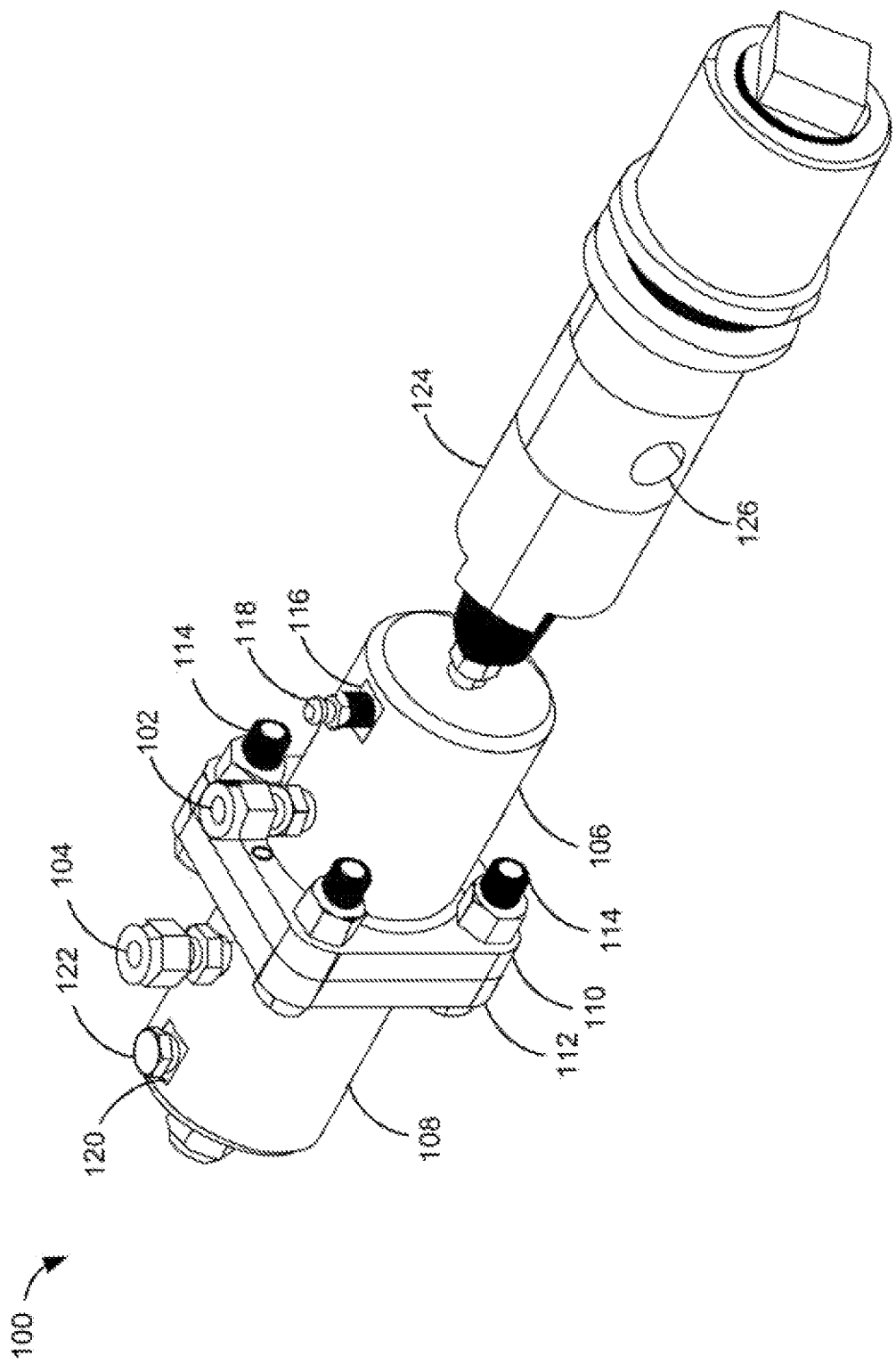
FIG. 1 illustrates an example differential pressure sensor in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Differential pressure sensors can be implemented between two locations in a fluid system to measure a differential pressure therebetween. For instance, a differential pressure sensor may be implemented across a compressor system to measure a change in pressure of the fluid through the compressor system. In some differential pressure sensors, a diaphragm is implemented between first and second chambers. Fluid from the two locations enters the corresponding first and second chambers, and can cause the diaphragm to deflect. In such cases, the differential pressure between the two locations can be determined based on a size and/or direction of the deflection.

Some differential pressure sensors implementing diaphragms are sensitive to relatively small changes in the differential pressure. Some such differential pressure sensors provide accurate measurements of the differential pressure, but may only operate in applications having a limited range of differential pressures and/or relatively low differential pressures (e.g., less than 300 pounds per square inch (psi)). Accordingly, such differential pressure sensors may not be suitable in some applications experiencing relatively large (e.g., greater than 300 psi) changes in pressure. Alternatively, in some cases, one or more absolute pressure sensors can be implemented at different locations in the fluid system, and the differential pressure between the different locations can be calculated based on the difference in absolute pressure measured by the absolute pressure sensors. However, implementation of such absolute pressure sensors increases a number of parts required and, thus, increases cost of the fluid system.

Examples disclosed herein implement a piston-integrated differential pressure sensor to measure differential pressure in a fluid system. An example differential pressure sensor disclosed herein implements a piston disposed in and movable between first and second housings. In a disclosed example, the first housing defines a first chamber fluidly coupled to a first location in the fluid system, and the second housing defines a second chamber fluidly coupled to a second location in the fluid system. In some examples, movement of the piston corresponds to a differential pressure between the first and second chambers, and the movement of the piston causes corresponding changes in pressure in a third chamber of the first housing. The third chamber is fluidly and/or operatively couplable to a pneumatic valve. For example, the pneumatic valve moves to an open position when the pressure in the third chamber is at or above a threshold, and the pneumatic valve moves to a closed position when the pressure in the third chamber is below the threshold. Advantageously, by implementing the piston instead of a diaphragm to measure the differential pressure, examples disclosed herein enable measurement of relatively large values (e.g., greater than 500 pounds per square inch (psi) and up to 3000 psi) of differential pressure.

FIG. 1 illustrates an example differential pressure sensor 100 in accordance with teachings of this disclosure. In the illustrated example of FIG. 1, the differential pressure sensor 100 can be operatively and/or fluidly coupled between a first location and a second location in a fluid system to measure a differential pressure therebetween. In this example, the differential pressure sensor 100 includes a first example port 102 fluidly couplable to the first location, and a second example port 104 fluidly couplable to the second location. The first port 102 is disposed in a first example housing 106, and the second port 104 is disposed in a second example housing 108. The first and second housings 106, 108 include example first and second flanged sections 110, 112, respectively. In this example, the first and second housings 106, 108 are coupled together via bolts 114 through the first and second flanged sections 110, 112. While four of the bolts 114 are used in this example, a different number and/or arrangement of the bolts 114 may be used instead.

In the illustrated example, the first housing 106 includes a third example port 116 in which an example bleed screw 118 is implemented. In some examples, the bleed screw 118 can be opened to allow fluid (e.g., air) from the first housing 106 to escape therefrom. Furthermore, the second housing 108 includes a fourth example port 120. In this example, an example plug 122 is disposed in the fourth port 120 to prevent and/or restrict flow of fluid therethrough.

In the illustrated example, the first housing 106 is fluidly and/or operatively coupled to an example pneumatic valve 124. In some examples, the pneumatic valve 124 moves between a first position (e.g., an open position) and a second position (e.g., a closed position) based on the differential pressure between the first and second housings 106, 108. For example, the pneumatic valve 124 moves to the first position when the differential pressure is at or above a threshold (e.g., a pressure threshold), and the pneumatic valve 124 moves to the second position when the differential pressure is below the threshold. In some examples, the threshold is greater than 500 psi and up to 3000 psi. In some examples, the pneumatic valve 124 is couplable to an air supply and to one or more control valves in the fluid system. In this example, the pneumatic valve 124 includes an example opening 126. In some examples, air from the air supply can flow through the opening 126 to the one or more control valves when the pneumatic valve 124 is in the first position, and the air is prevented from flowing through the opening 126 when the pneumatic valve 124 is in the second position.

Figure 2:
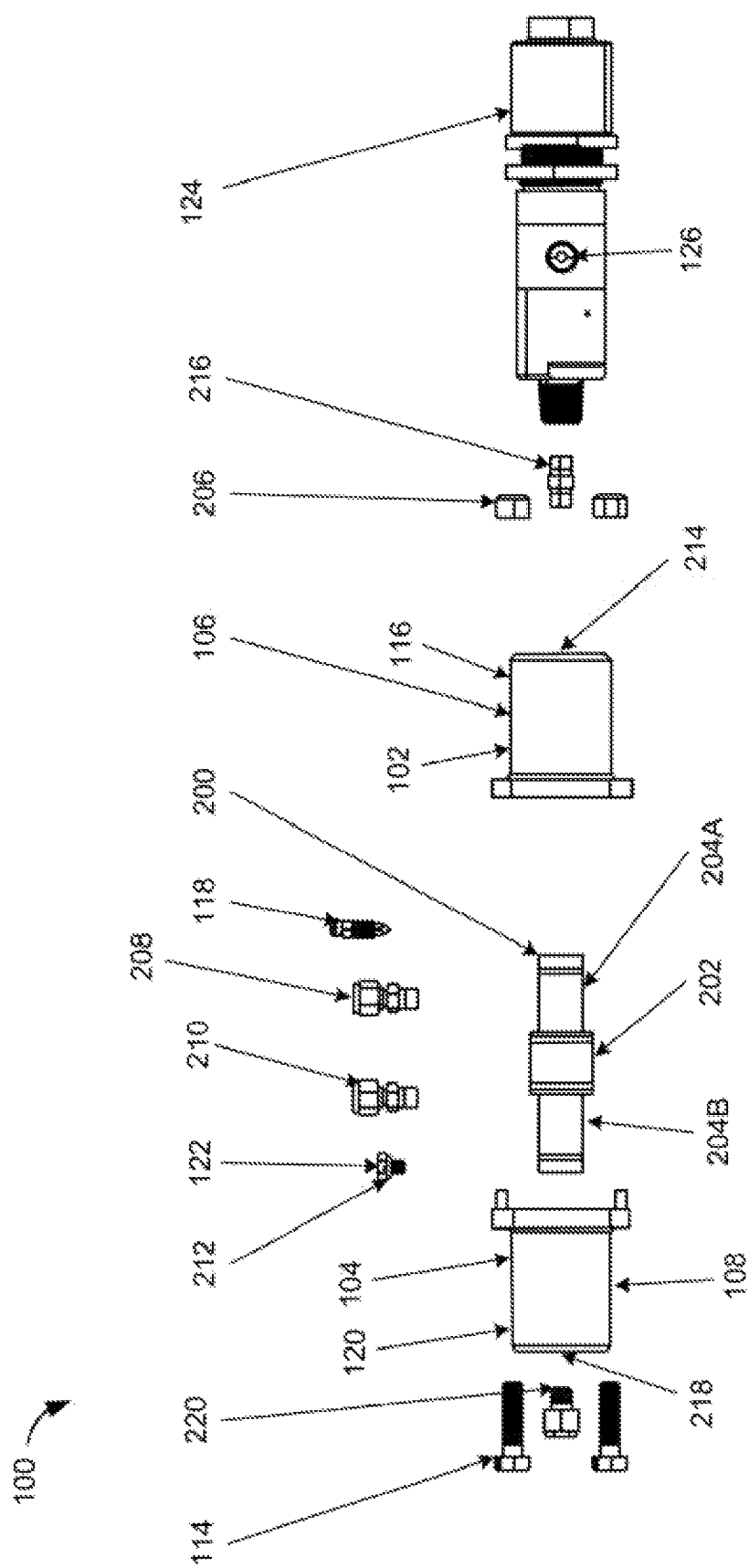
FIG. 2 is an exploded side view of the example differential pressure sensor of FIG. 1.

FIG. 2 is an exploded side view of the example differential pressure sensor 100 of FIG. 1. In the illustrated example of FIG. 2, the differential pressure sensor 100 includes an example piston 200 to be disposed in and slidably coupled to the first and second housings 106, 108. In this example, the piston 200 includes a first example cylindrical section 202 coupled between second example cylindrical sections 204A, 204B. In this example, a first cross-sectional diameter of the first cylindrical section 202 is greater than a second cross-sectional diameter of the second cylindrical sections 204A, 204B. In this example, the first and second housings 106, 108 are to be coupled around the piston 200 via the bolts 114 and corresponding example nuts 206.

In the illustrated example, example fittings 208, 210 are to be disposed in the corresponding first and second ports 102, 104. Furthermore, the bleed screw 118 and the plug 122 are to be disposed in the corresponding third and fourth ports 116, 120. In this example, the plug 122 includes an example O-ring 212 to sealably couple the plug 122 to the second housing 108.

The first housing 106 includes a first example longitudinal opening 214 in which an example adapter fitting 216 is to be disposed. In this example, the first housing 106 is couplable to the pneumatic valve 124 via the adapter fitting 216. Similarly, the second housing includes a second example longitudinal opening 218, and an example bolt 220 is to be disposed therein. In this example, the bolt 220 is to prevent fluid in the second housing 108 from flowing through the second longitudinal opening 218.

Figure 3:
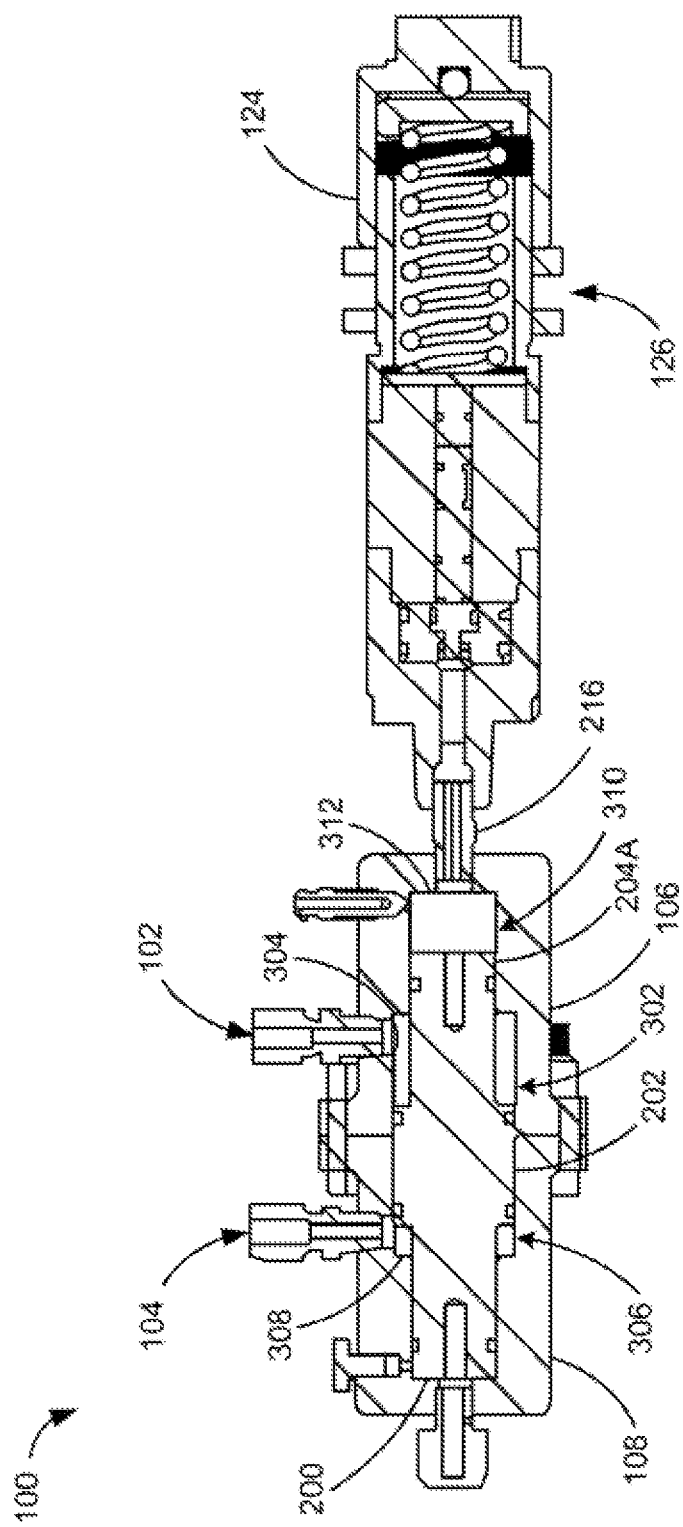
FIG. 3 is a cross-sectional view of the example differential pressure sensor of FIGS. 1 and/or 2.

FIG. 3 is a cross-sectional view of the example differential pressure sensor 100 of FIGS. 1 and/or 2. In the illustrated example of FIG. 3, a first example chamber 302 is defined in the first housing 106 between a first inner surface 304 of the first housing 106 and the first cylindrical section 202 of the piston 200. Furthermore, a second example chamber 306 is defined in the second housing 108 between a second inner surface 308 of the second housing 108 and the first cylindrical section 202 of the piston 200. In this example, the first chamber 302 is fluidly coupled to the first location of the fluid system via the first port 102, and the second chamber 306 is fluidly coupled to the second location of the fluid system via the second port 104. In some examples, the first location corresponds to a fluid inlet of a compressor system, and the second location corresponds to a fluid outlet of the compressor system. In such examples, first fluid (e.g., inlet fluid, low-pressure fluid) flows to the first chamber 302 from the fluid inlet, and second fluid (e.g., discharge fluid, high-pressure fluid) flows to the second chamber 306 from the fluid outlet.

In the illustrated example, the first housing 106 defines a third example chamber 310 between a third inner surface 312 of the first housing 106 and the second cylindrical section 204A of the piston 200. In this example, the piston 200 is sealably coupled to the first and second housings 106, 108 such that fluid does not flow between the first, second, and third chambers 302, 306, 310. The third chamber 310 is fluidly coupled to the pneumatic valve 124. In this example, the third chamber 310 includes a working fluid (e.g., glycol) therein. In this example, the working fluid is glycol. In other examples, the working fluid may be different.

In this example, a pressure in the third chamber 310 corresponds to a differential pressure between the first and second fluids in the first and second chambers 302, 306, respectively. For example, when a first pressure of the first fluid is greater than a second pressure of the second fluid, the piston 200 moves leftward in the illustrated example of FIG. 3. In such an example, when the piston 200 moves leftward, the pressure of the working fluid in the third chamber 310 is reduced. Conversely, when the first pressure of the first fluid is less than the second pressure of the second fluid, the piston 200 moves rightward in the illustrated example of FIG. 3. In such an example, when the piston 200 moves rightward, the pressure of the working fluid in the third chamber 310 increases.

In this example, the working fluid flows to the pneumatic valve 124 via the adapter fitting 216. In this example, the pneumatic valve 124 includes an example spring 314. The spring 314 biases the pneumatic valve 124 to a closed position in which air is prevented from flowing through the opening 126. When the pressure of the working fluid is above a threshold, the pressure overcomes a force of the spring 314 and causes the pneumatic valve 124 to move to an open position. In the open position, the pneumatic valve 124 enables the flow of air through the opening 126.

Figure 4:
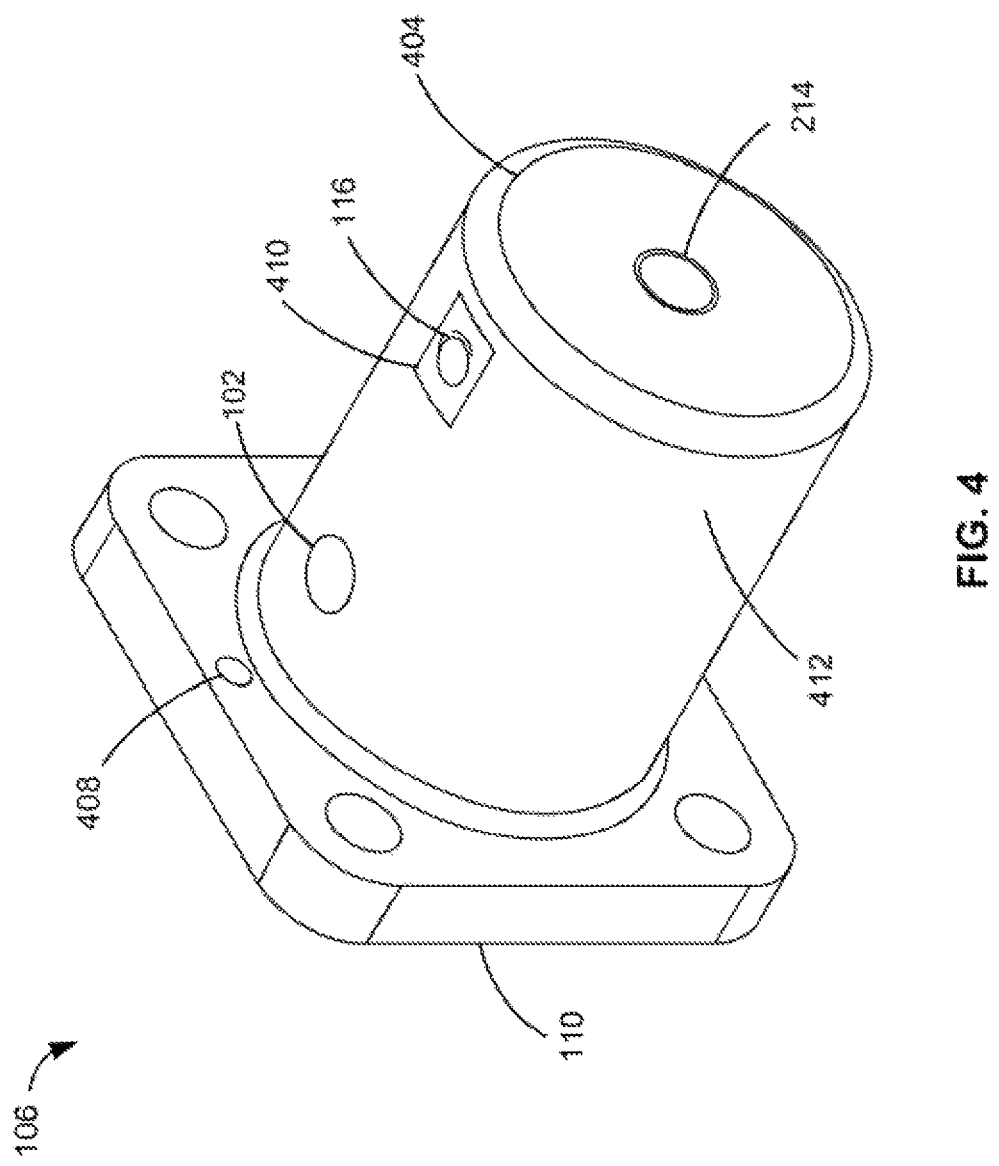
FIG. 4 illustrates the example housing of the example differential pressure sensor of FIGS. 1, 2, and/or 3.

FIG. 4 illustrates the example first housing 106 of the example differential pressure sensor 100 of FIGS. 1, 2, and/or 3. While the first housing 106 is shown in this example, the example second housing 108 of FIGS. 1, 2, and/or 3 is substantially the same as the first housing 106. In the illustrated example of FIG. 4, the first flanged section 110 is square with rounded edges. In other examples, a different shape of the first flanged section 110 may be used instead.

In the illustrated example, the first flanged section 110 includes an alignment opening 408. In some examples, a pin is disposed in the alignment opening 408 to enable alignment of the first and second housings 106, 108 during assembly of the differential pressure sensor 100. In this example, an example flattened portion 410 surrounds the third port 116 on an outer surface 412 of the first housing 106. In some examples, the flattened portion 410 enables an O-ring to be sealably coupled to the outer surface 412.

Figure 5:
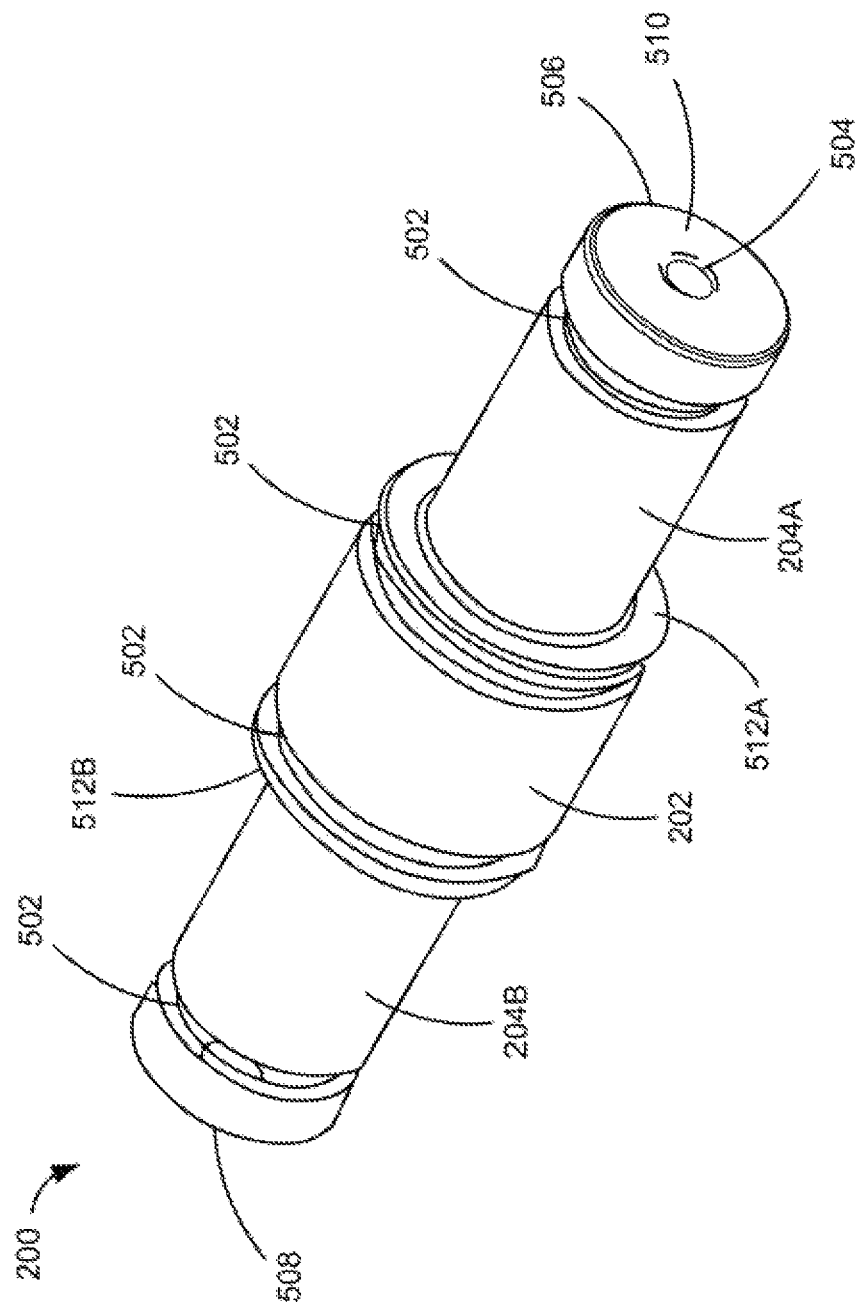
FIG. 5 illustrates the example piston of the example differential pressure sensor of FIGS. 1, 2, and/or 3.

FIG. 5 illustrates the example piston 200 of the example differential pressure sensor 100 of FIGS. 1, 2, and/or 3. In the illustrated example of FIG. 5, the first and second cylindrical sections 202, 204A, 204B include example grooves 502 about a circumference of the first and second cylindrical sections 202, 204A, 204B. In some examples, seals may be implemented in each of the grooves 502 to prevent flow of fluid between the first, second, and third chambers 302, 306, 310 of FIG. 3. In this example, an example aperture 504 extends partially into the second cylindrical section 204A proximate a first end 506 of the piston 200. In some examples, a similar aperture 504 may be implemented at a second end 508 of the piston 200. The aperture 504 enables positioning of the piston 200 within the first and second housings 106, 108 when the first and second housings 106, 108 are coupled together.

In this example, the first end 506 includes a first surface 510, and the first cylindrical section 202 includes second and third surfaces 512A, 512B. In this example, the differential pressure corresponds to a difference between pressure on the second surface 512A and pressure on the third surface 512B. In this example, a first surface area of the first surface 510 is substantially the same as a second surface area of each of the second and third surfaces 512A, 512B (e.g., within 5%). In such examples, the differential pressure between the second and third surfaces 512A, 512B corresponds to the pressure applied by the second surface 512 onto the working fluid in the third chamber 310 of FIG. 3.

In some examples, the differential pressure sensor 100 of FIGS. 1, 2, and/or 3 can be implemented in connection with a compressor system fluidly and/or operatively coupled between a fluid intake and a fluid discharge. In some such examples, the compressor system includes a first compressor unit fluidly coupled to a second compressor unit, and a control valve is operatively coupled between the first and second compressor units. In this example, the first and second compressor units can switch between a parallel configuration and a series configuration by switching the control valve between a first position and a second position. For example, the first and second compressor units are in the parallel configuration when the control valve is in the first position, and the first and second compressor units are in the series configuration when the control valve is in the second position. In some examples, a change in fluid pressure across the compressor system is increased when the first and second compressor units are in the series configuration compared to the parallel configuration.

In some examples, the differential pressure sensor 100 is operatively coupled between the fluid intake and the fluid discharge to measure a differential pressure across the compressor system. Furthermore, the pneumatic valve 124 is operatively coupled to the control valve. In this example, the control valve is pneumatically-actuated. In particular, the control valve is in the first position when the pneumatic valve 124 prevents flow of air to the control valve, and the control valve is in the second position when the pneumatic valve 124 directs flow of air to the control valve.

In some examples, the first and second compressor units switch between the parallel and series configurations based on the differential pressure measured by the differential pressure sensor 100. For example, when the differential pressure is below a threshold, the pneumatic valve 124 is in the closed position and prevents flow of air to the control valve via the opening 126. Accordingly, the control valve is in the first position, such that fluid from the fluid intake is compressed by the first and second compressor units in parallel. Conversely, when the differential pressure is at or above the threshold, the differential pressure sensor 100 causes the pneumatic valve 124 to move to the open position. When the pneumatic valve 124 is in the open position, air flows to the control valve via the opening 126 and causes the control valve to switch to the second position. In such examples, fluid from the fluid intake is compressed by the first and second compressor units in series, thereby increasing (e.g., doubling) a change in pressure of the fluid compared to the first and second compressor units in parallel.

In some examples, the differential pressure sensor 100 implements means for measuring differential pressure, the first housing 106 implements means for providing a first port, the second housing 108 implements means for providing a second port, and the piston 200 implements means for translating.

Figure 6:
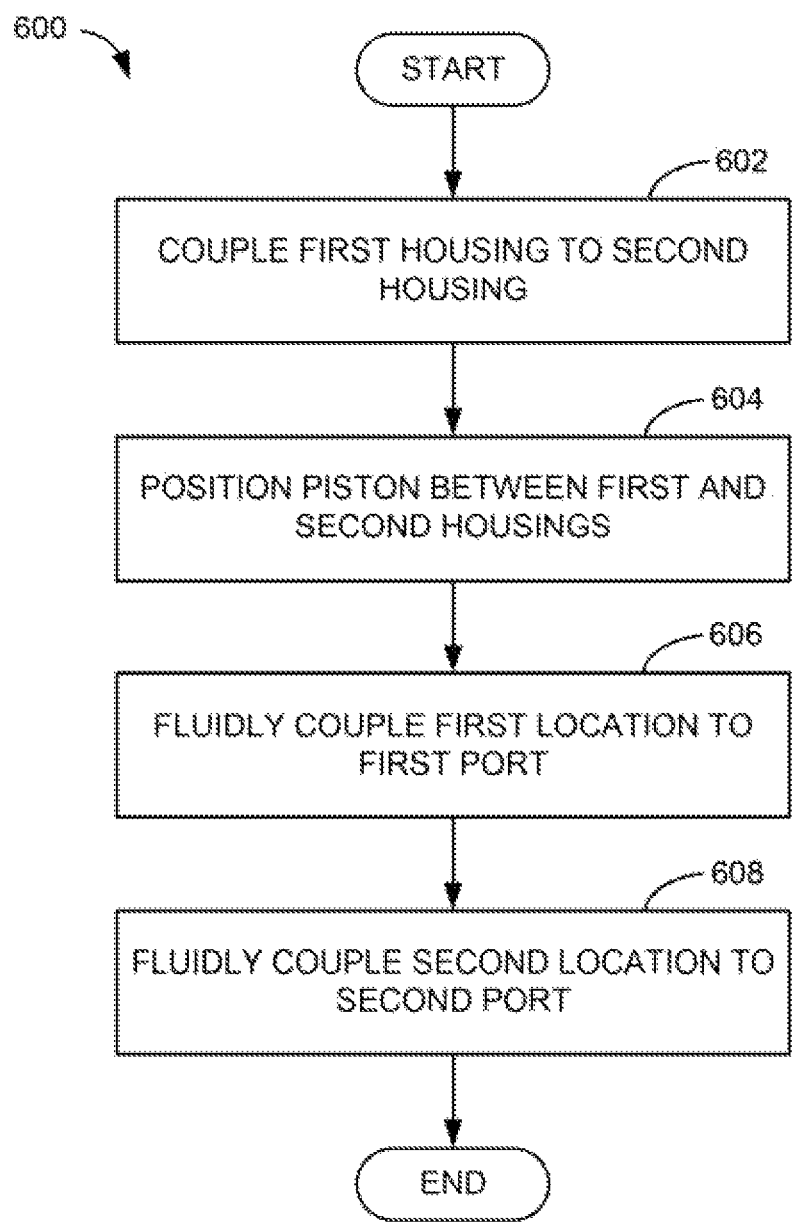
FIG. 6 is a flowchart representative of an example method to produce example devices disclosed herein.

FIG. 6 is a flowchart representative of an example method to produce example devices disclosed herein. For example, an example process 600 of FIG. 6 can be executed to produce the differential pressure sensor 100 of FIGS. 1, 2, and/or 3. The example process 600 begins at block 602, at which the example first housing 106 is coupled to the example second housing 108. For example, the first and second housings 106, 108 are coupled together via the bolts 114 of FIG. 1.

At block 604, the example piston 200 is positioned between the first and second housings 106, 108. For example, the piston 200 is slidably disposed within the first and second housings 106, 108 and defines the first, second, and third chambers 302, 306, 310 of FIG. 3.

At block 606, the first port 102 is fluidly coupled to a first location in a fluid system. For example, the first fitting 208 is disposed in the first port 102, and first fluid from the first location can flow to the first port 102 via the first fitting 208. In some examples, the first location corresponds to a fluid inlet of a compressor.

At block 608, the second port 104 is fluidly coupled to a second location in the fluid system. For example, the second fitting 210 is disposed in the second port 104, and second fluid from the second location can flow to the second port 104 via the second fitting 210. In some examples, the second location corresponds to a fluid outlet of a compressor.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that measure differential pressure between two locations in a fluid system. Examples disclosed herein implement a piston between first and second housings, where movement of the piston corresponds to the differential pressure. As such, by implementing the piston instead of a diaphragm, examples disclosed herein enable measurement of relatively large values of the differential pressure in the fluid system.

Example methods, apparatus, systems, and articles of manufacture to measure differential pressure are disclosed herein. Further examples and combinations thereof include the following:

Example 1 includes an apparatus to measure differential pressure, the apparatus comprising a first housing including a first port, the first port fluidly coupled to a first location, first fluid to flow into the first port from the first location, a second housing coupled to the first housing, the second housing including a second port, the second port fluidly coupled to a second location, second fluid to flow into the second port from the second location, and a piston slidably disposed between the first and second housings, the first and second fluids to cause movement of the piston, the movement of the piston corresponding to a differential pressure between the first and second locations.

Example 2 includes the apparatus of example 1, wherein the piston includes a first cylindrical section coupled between second cylindrical sections, a first cross-sectional diameter of the first cylindrical section greater than a second cross-sectional diameter of the second cylindrical sections.

Example 3 includes the apparatus of example 2, wherein a first surface area of the first cylindrical section corresponds to a second surface area of the second cylindrical sections.

Example 4 includes the apparatus of example 2, wherein the first fluid flows into a first chamber of the first housing and the second fluid flows into a second chamber of the second housing, the first chamber provided between the first cylindrical section and a first inner surface of the first housing, the second chamber provided between the first cylindrical section and a second inner surface of the second housing.

Example 5 includes the apparatus of example 4, further including a third chamber provided in the first housing between a first surface of one of the second cylindrical sections and a third inner surface of the first housing, the third chamber to include a working fluid.

Example 6 includes the apparatus of example 1, wherein the piston includes an aperture at an end of the piston and partially extending into the piston, the aperture to enable positioning of the piston within the first and second housings.

Example 7 includes the apparatus of example 1, wherein the first housing is operatively coupled to a pneumatic valve, the pneumatic valve to move to an open position when the differential pressure is at or above a pressure threshold.

Example 8 includes the apparatus of example 1, wherein the pressure threshold is between 500 pounds per square inch (psi) and 3000 psi.

Example 9 includes the apparatus of example 1, wherein the first location corresponds to a fluid inlet of a compressor, and the second location corresponds to a fluid outlet of the compressor.

Example 10 includes a method comprising coupling a first housing to a second housing, the first housing including a first port, the second housing including a second port, positioning a piston within the first and second housings, the piston to translate within the first and second housings, fluidly coupling a first location to a first port, first fluid to flow into the first port from the first location, and fluidly coupling a second location to the second port, second fluid to flow into the second port from the second location, the first and second fluids to cause movement of the piston, the movement of the piston corresponding to a differential pressure between the first and second locations.

Example 11 includes the method of example 10, further including coupling a first cylindrical section between second cylindrical sections to produce the piston, a first cross-sectional diameter of the first cylindrical section greater than a second cross-sectional diameter of the second cylindrical sections, a first surface area of the first cylindrical section corresponding to a second surface area of the second cylindrical sections.

Example 12 includes the method of example 11, further including coupling the first port to a first chamber of the first housing and the second port to a second chamber of the second housing, the first chamber provided between the first cylindrical section and a first inner surface of the first housing, the second chamber provided between the first cylindrical section and a second inner surface of the second housing.

Example 13 includes the method of example 12, further including providing a working fluid in a third chamber of the first housing, the third chamber provided between a first surface of one of the second cylindrical sections and a third inner surface of the first housing.

Example 14 includes the method of example 10, further including providing an aperture at an end of the piston and partially extending into the piston, the aperture to enable positioning of the piston within the first and second housings.

Example 15 includes the method of example 10, further including operatively coupling the first housing to a pneumatic valve, the pneumatic valve to move to an open position when the differential pressure is at or above a pressure threshold.

Example 16 includes an apparatus to measure differential pressure, the apparatus comprising means for providing a first port fluidly coupled to a first location, first fluid to flow from the first location into the means for providing the first port, means for providing a second port fluidly coupled to a second location, the means for providing the second port coupled to the means for providing the first port, second fluid to flow from the second location into the means for providing the second port, and means for translating slidably disposed between the means for providing the first port and the means for providing the second port, the first and second fluids to cause movement of the means for translating, the movement of the means for translating corresponding to a differential pressure between the first and second locations.

Example 17 includes the apparatus of example 16, wherein a first cross-sectional diameter of a first cylindrical section of the means for translating is greater than a second cross-sectional diameter of second cylindrical sections of the means for translating, the first cylindrical section coupled between the second cylindrical sections.

Example 18 includes the apparatus of example 17, wherein a first surface area of the first cylindrical section corresponds to a second surface area of the second cylindrical sections.

Example 19 includes the apparatus of example 17, wherein the first fluid flows into a first chamber of the means for providing the first port and the second fluid flows into a second chamber of the means for providing the second port, the first chamber provided between the first cylindrical section and a first inner surface of the means for providing the first port, the second chamber provided between the first cylindrical section and a second inner surface of the means for providing the second port.

Example 20 includes the apparatus of example 19, further including a third chamber provided in the means for providing the first port between a first surface of one of the second cylindrical sections and a third inner surface of the means for providing the first port, the third chamber to include a working fluid.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to measure differential pressure, the apparatus comprising:
   a first housing including a first port, the first port fluidly coupled to a first location, first fluid to flow into the first port from the first location;
   a second housing coupled to the first housing, the second housing including a second port, the second port fluidly coupled to a second location, second fluid to flow into the second port from the second location;
   a piston slidably disposed between the first and second housings, the first and second fluids to cause movement of the piston, the movement of the piston corresponding to a differential pressure between the first and second locations; and
   a pneumatic valve operatively coupled to the first housing, the pneumatic valve to move to an open position when the differential pressure is at or above a pressure threshold.

2. The apparatus of claim 1, wherein the piston includes a first cylindrical section coupled between second cylindrical sections, a first cross-sectional diameter of the first cylindrical section greater than a second cross-sectional diameter of the respective second cylindrical sections.

3. The apparatus of claim 2, wherein a first surface area of the first cylindrical section corresponds to a second surface area of the respective second cylindrical sections.

4. The apparatus of claim 2, wherein the first fluid flows into a first chamber of the first housing and the second fluid flows into a second chamber of the second housing, the first chamber provided between the first cylindrical section and a first inner surface of the first housing, the second chamber provided between the first cylindrical section and a second inner surface of the second housing.

5. The apparatus of claim 4, further including a third chamber provided in the first housing between a first surface of one of the second cylindrical sections and a third inner surface of the first housing, the third chamber to include a working fluid.

6. The apparatus of claim 1, wherein the piston includes an aperture at an end of the piston and partially extending into the piston, the aperture to enable positioning of the piston within the first and second housings.

7. The apparatus of claim 1, wherein the pressure threshold is between 500 pounds per square inch (psi) and 3000 psi.

8. The apparatus of claim 1, wherein the first location corresponds to a fluid inlet of a compressor, and the second location corresponds to a fluid outlet of the compressor.

9. An apparatus to measure differential pressure, the apparatus comprising:
   means for providing a first port fluidly coupled to a first location, first fluid to flow from the first location into the means for providing the first port;
   means for providing a second port fluidly coupled to a second location, the means for providing the second port coupled to the means for providing the first port, second fluid to flow from the second location into the means for providing the second port;

means for translating slidably disposed between the means for providing the first port and the means for providing the second port, the first and second fluids to cause movement of the means for translating, the movement of the means for translating corresponding to a differential pressure between the first and second locations; and means for controlling air flow therethrough operatively coupled to the means for providing the first port, the means for controlling air flow therethrough to move to an open position when the differential pressure is at or above a pressure threshold.

10. The apparatus of claim 9, wherein a first cross-sectional diameter of a first cylindrical section of the means for translating is greater than a second cross-sectional diameter of second cylindrical sections of the means for translating, the first cylindrical section coupled between the second cylindrical sections.

11. The apparatus of claim 10, wherein a first surface area of the first cylindrical section corresponds to a second surface area of the second cylindrical sections.

12. The apparatus of claim 10, wherein the first fluid flows into a first chamber of the means for providing the first port and the second fluid flows into a second chamber of the means for providing the second port, the first chamber provided between the first cylindrical section and a first inner surface of the means for providing the first port, the second chamber provided between the first cylindrical section and a second inner surface of the means for providing the second port.

13. The apparatus of claim 12, further including a third chamber provided in the means for providing the first port between a first surface of one of the second cylindrical sections and a third inner surface of the means for providing the first port, the third chamber to include a working fluid.

* * * * *